(12) United States Patent
Miao et al.

(10) Patent No.: US 10,326,114 B2
(45) Date of Patent: Jun. 18, 2019

(54) BATTERY COVER CATCH APPARATUS

(71) Applicant: HYTERA COMMUNICATIONS CORP., LTD., Shenzhen, Guangdong Province (CN)

(72) Inventors: Liheng Miao, Shenzhen (CN); Yuzhong Wu, Shenzhen (CN)

(73) Assignee: HYTERA COMMUNICATIONS CORP, LTD., Shenzhen, Guangdong Province (CN)

( * ) Notice: Subject to any disclaimer, the term of this patent is extended or adjusted under 35 U.S.C. 154(b) by 1 day.

(21) Appl. No.: 15/540,026

(22) PCT Filed: Dec. 26, 2014

(86) PCT No.: PCT/CN2014/095192
§ 371 (c)(1),
(2) Date: Jun. 26, 2017

(87) PCT Pub. No.: WO2016/101273
PCT Pub. Date: Jun. 30, 2016

(65) Prior Publication Data
US 2017/0346048 A1 Nov. 30, 2017

(51) Int. Cl.
*H01M 2/04* (2006.01)
*H01M 2/10* (2006.01)
*H04M 1/02* (2006.01)
*H04B 1/3888* (2015.01)

(52) U.S. Cl.
CPC .......... *H01M 2/04* (2013.01); *H01M 2/1016* (2013.01); *H01M 2/1022* (2013.01); *H04M 1/0249* (2013.01); *H04M 1/0262* (2013.01); *H01M 2220/30* (2013.01); *H04B 1/3888* (2013.01)

(58) Field of Classification Search
CPC .... H01M 2/04; H01M 2/1016; H01M 2/1022; H01M 2220/30; H04M 1/0262; H04M 1/0249; H04B 1/3888
See application file for complete search history.

(56) References Cited

U.S. PATENT DOCUMENTS

2006/0292439 A1* 12/2006 Zuo ................. H01M 2/1066
429/97
2012/0039025 A1 2/2012 Chen et al.

FOREIGN PATENT DOCUMENTS

| CN | 201259902 Y | 6/2009 |
|---|---|---|
| CN | 101872851 A | 10/2010 |
| CN | 102222783 A | 10/2011 |
| CN | 204407384 U | 6/2015 |

* cited by examiner

*Primary Examiner* — Cynthia K Walls
(74) *Attorney, Agent, or Firm* — Cheng-Ju Chiang

(57) ABSTRACT

The present disclosure provides a battery cover catch apparatus. The apparatus includes a battery cover, a slide switch, a catch, and a body. A chute which longitudinally extends is provided on the battery cover. The slide switch is disposed on the chute so as to be able to slide between a first position and a second position. The slide switch includes a block located inside the battery cover. The block is connected to the catch so as to drive the catch to slide synchronously. The catch includes a tongue disposed in a same direction as the extending direction of the chute. The body is provided with a recess correspondingly matching to the tongue. The tongue is engaged with the recess when the slide switch is in a first position, and the tongue is separated from the recess when the slide switch is in a second position.

19 Claims, 7 Drawing Sheets

BATTERY COVER CATCH APPARATUS

CROSS REFERENCE TO RELATED APPLICATIONS

The present application is a 35 U.S.C. § 371 National Phase conversion of International (PCT) Patent Application No. PCT/CN2014/095192, filed on Dec. 26, 2014, the disclosure of which is incorporated by reference herein. The PCT International Patent Application was filed and published in Chinese.

TECHNICAL FIELD

Embodiments of the present disclosure generally relate to battery cover apparatus, and in particular relate to a battery cover catch apparatus.

BACKGROUND

The battery cover catch structures in consumer electronics, wireless communications devices, household appliances, and related technologies need to pass a certain degree of reliability testing, and their requirements are usually achieved by a structure which implements the locking of a battery cover through multiple components. Increased number of components makes their assemblies complicated, while the cost is also increased.

SUMMARY

The technical problem to be solved by the present disclosure is to provide an improved battery cover catch apparatus.

The technical scheme adopted the present disclosure to solve the technical problem is to construct a battery cover catch apparatus including:

a battery cover, and a chute extending along a longitudinal direction;

a slide switch disposed on the chute so as to be able to slide between a first position and a second position, and the slide switch may include a block located inside the battery cover;

a catch including a tongue disposed in a same direction as the extending direction of the chute, wherein the block may be connected to the catch so as to drive the catch to slide synchronously; and a body defining a recess correspondingly matching the tongue, where the tongue may be engaged in the recess when the slide switch is in the first position, and the tongue may be separated from the recess when the slide switch is in the second position.

In one embodiment, the block may include an elongated structure (not labeled) disposed in the same direction as the extending direction of the chute. The elongated structure has an outline not larger than the outline of the chute. Another side of the catch is provided with an installation slot for the block to be inserted laterally.

In one embodiment, an inlet of the installation slot may be provided with an oblique guide surface to guide the block into the installation slot.

In one embodiment, the guide surface may protrude from an inner surface of the installation slot to form a limit stage for preventing the block from coming off.

In one embodiment, a side of the block away from the battery cover may be provided with a slope corresponding to an inclination direction of the guide surface.

In one embodiment, the tongue may protrude from a surface of the catch which is opposite to the installation slot, and may be disposed on the surface of the catch in the extending direction of the chute.

In one embodiment, the extending direction of the recess may be the same as the extending direction of the chute, a side wall of the recess opposite to the battery cover may define an opening corresponding to the tongue such that the tongue can be detached from the recess while separated from the recess.

In one embodiment, the tongue may be provided on a side of the catch which is away from the battery cover.

In one embodiment, the slide switch may include a connection portion which is disposed in the chute by passing through the chute and is connected to a middle portion of the block forming a T-shaped structure, and a side of the catch opposite to the slide switch may be provided with an evading slot for evading the connection portion and communicating with the installation slot.

In one embodiment, the slide switch may further include a handle located on an outside of the battery cover and connected to the connection portion, the handle is slidably engaged with an outer surface of the battery cover.

The following advantageous effects can be obtained by implementing the battery cover catch apparatus of the present disclosure: through providing the slide switch which is capable of sliding back and forth on the battery cover in the present disclosure, the catch can be driven to engage with and separate from the recess on the body, which reduces the amount of components and has a structure easy to install the sliding switch and the catch, and also makes the tongue and the recess to have an adequate mating surface so as to ensure the stability of matching while saving costs

BRIEF DESCRIPTION OF THE DRAWINGS

The present disclosure will now be further described with reference to the accompanying drawings and embodiments, in which.

DETAILED DESCRIPTION

For a clear understanding of the technical features, objects and effects of the present disclosure, specific embodiments of the present disclosure will now be described in detail with reference to the accompanying drawings.

Figure 1:
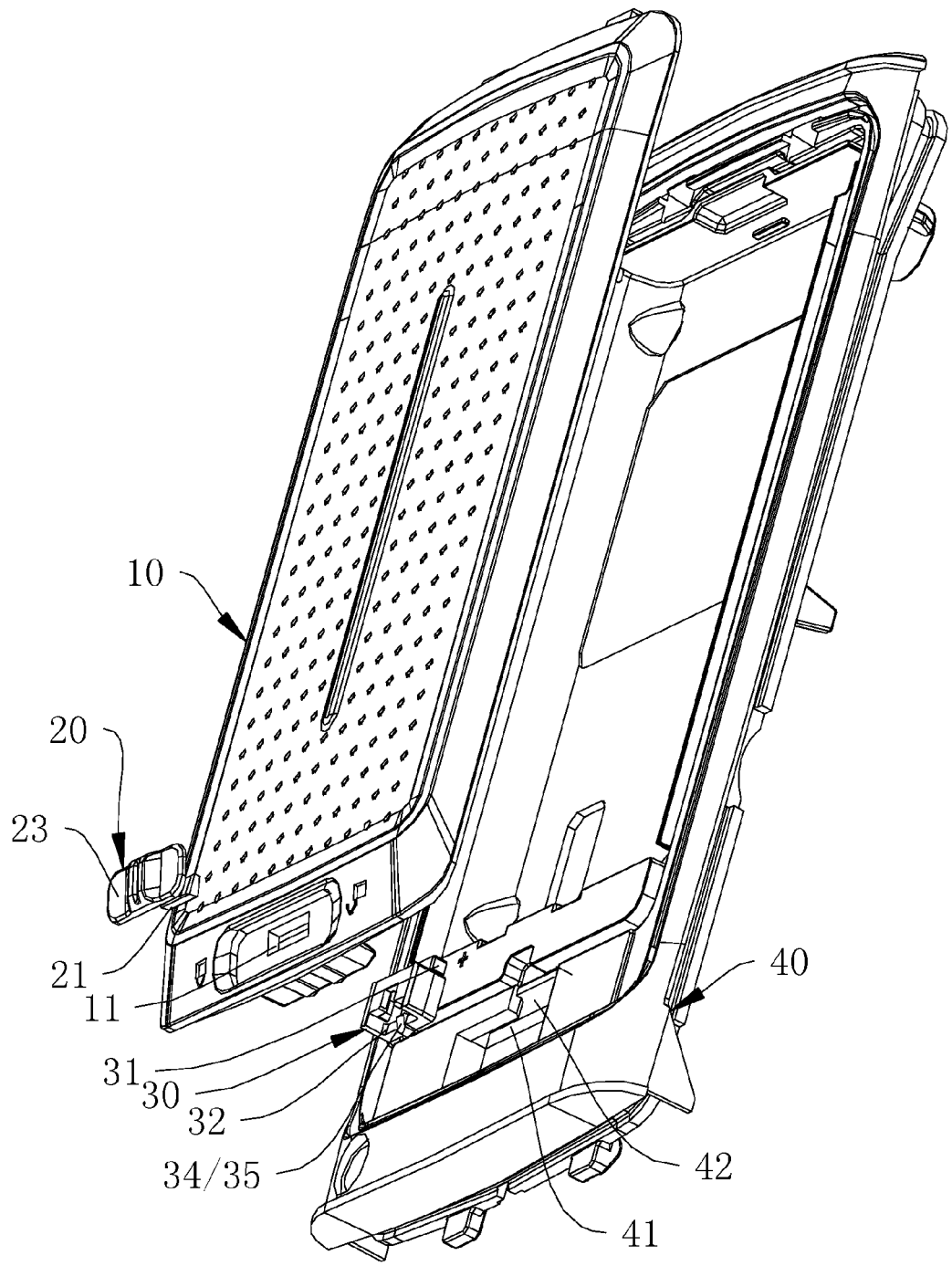
FIG. 1 is an exploded view of a battery cover catch apparatus according to an embodiment of the present disclosure.
Figure 2:
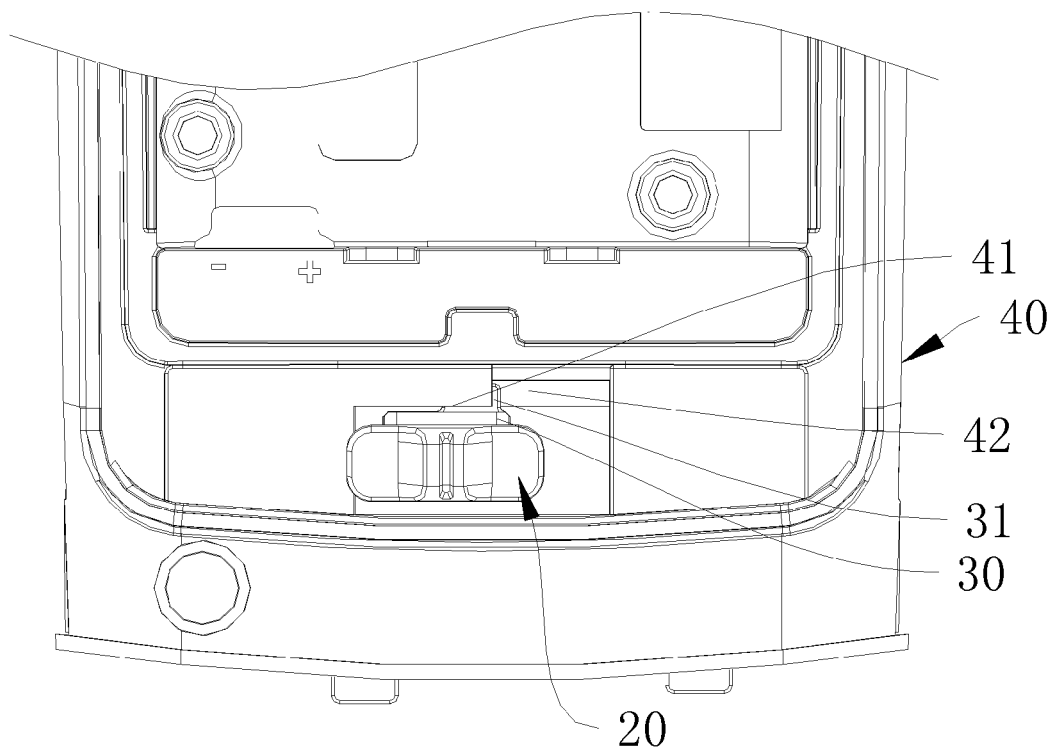
FIG. 2 is a structure schematic diagram of the slide switch and the catch of the battery cover catch structure in FIG. 1 which are in a first position to engage in a recess of a body.
Figure 3:
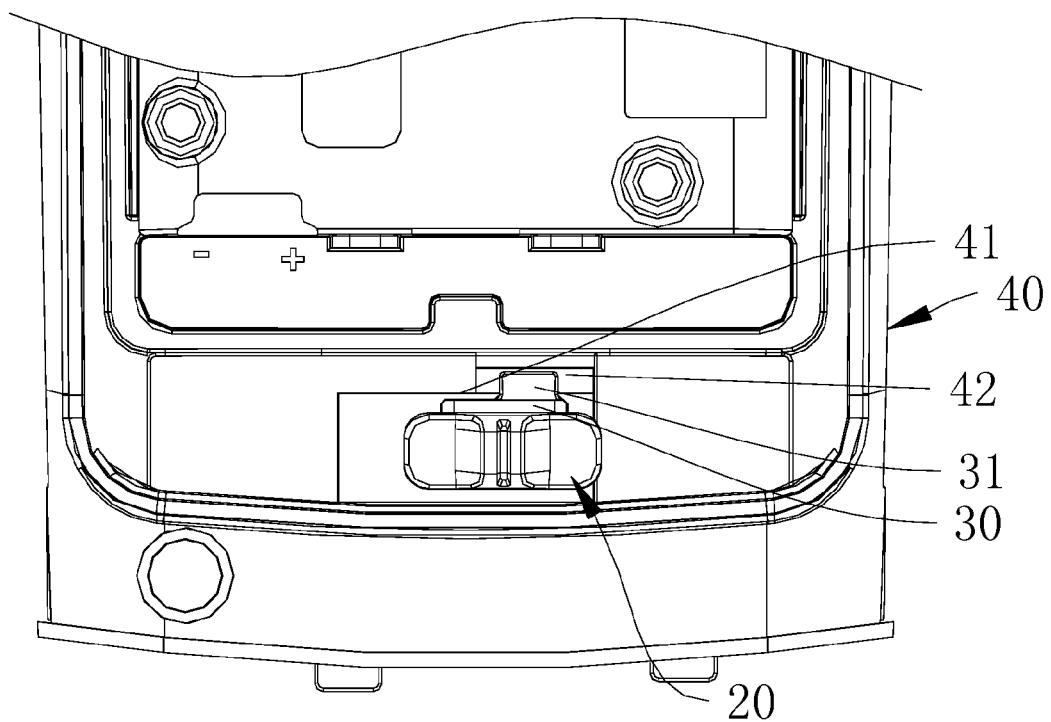
FIG. 3 is a structure schematic diagram of the slide switch and the catch of the battery cover catch structure in FIG. 1 which are in a second position to separate from the recess of the body.
Figure 4:
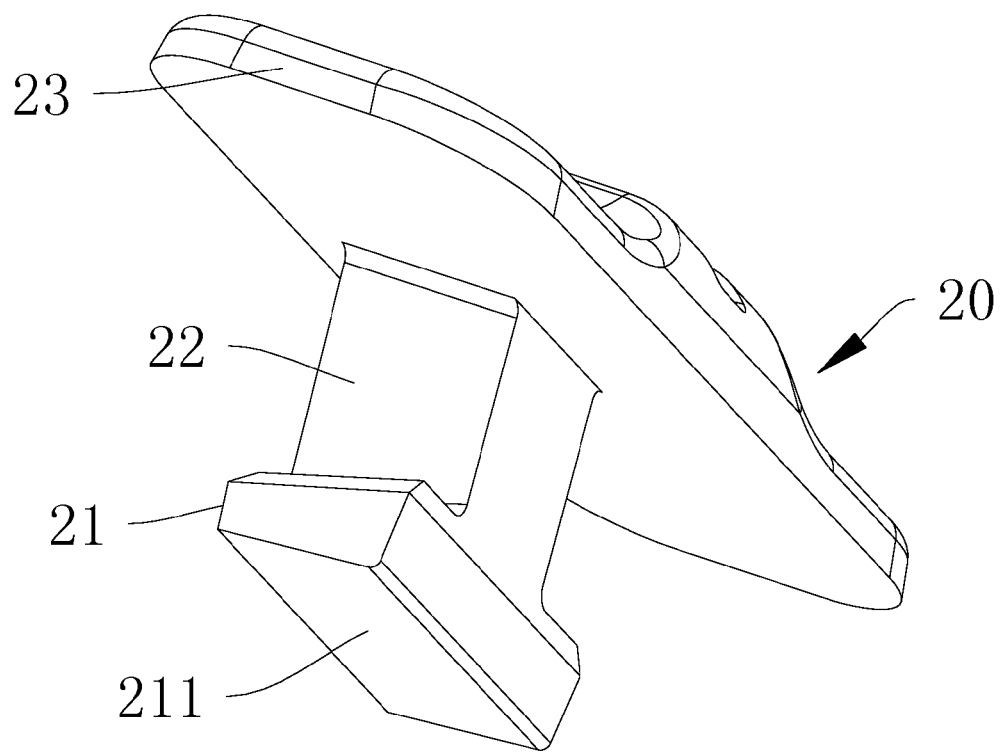
FIG. 4 is a structure schematic diagram of the slide switch in FIG. 1.
Figure 5:
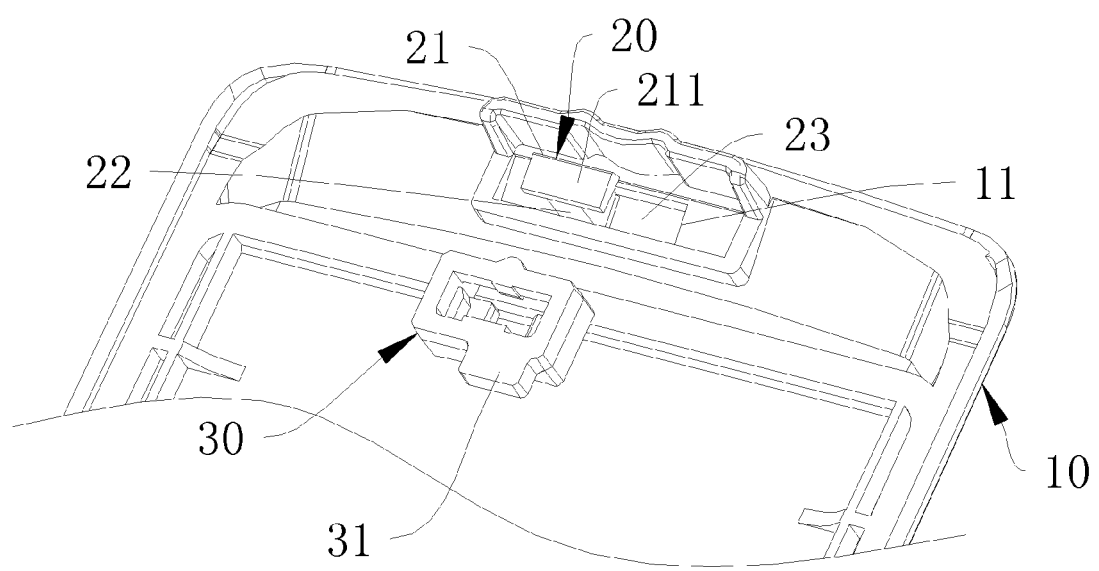
FIG. 5 is a schematic diagram of an assembly relationship between the slide switch as well as a battery cover and the catch.
Figure 6:
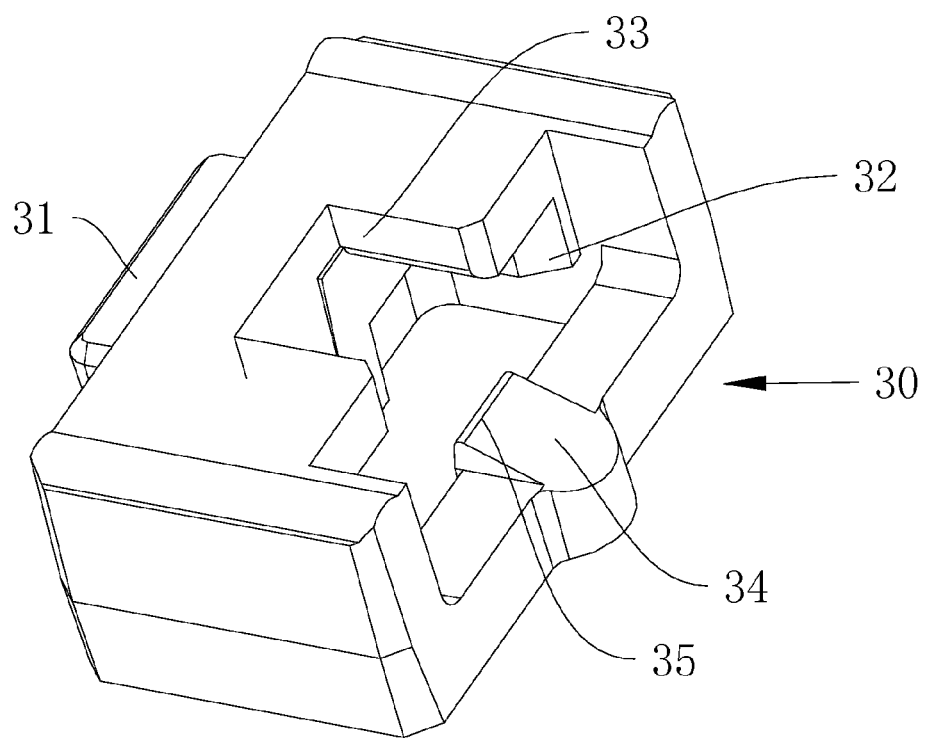
FIG. 6 is a three-dimensional structure schematic diagram of the catch in FIG. 1.
Figure 7:
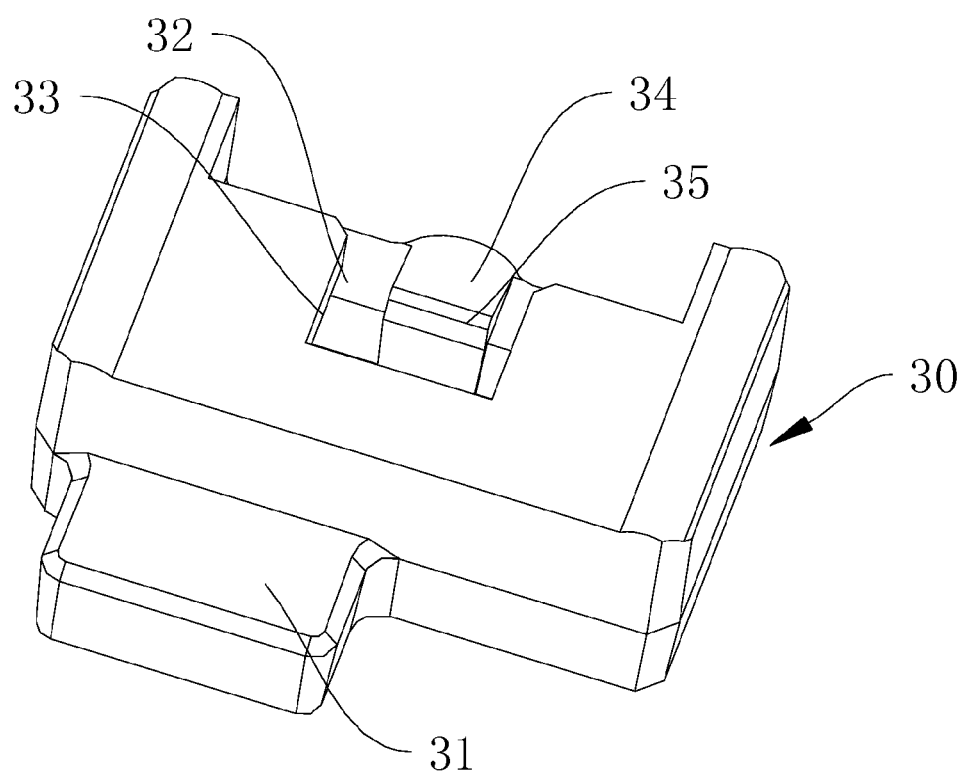
FIG. 7 is a three-dimensional structure schematic diagram of another angle of the catch in FIG. 1.

Referring to FIGS. 1 to 3, the battery cover catch apparatus of the present disclosure may include a battery cover 10, a slide switch 20, a catch 30, and a body 40. A chute 11 extending along a longitudinal direction is defined in the battery cover 10. The slide switch 20 can be engaged in the chute 11, and can slide between a first position and a second position. The slide switch 20 may include a block 21 which is located inside the battery cover 21. The block 21 may be connected to the catch 30, so as to drive the catch 30 to slide synchronously. The catch 30 may include a tongue 31 which is disposed in a same direction as the extending direction of the chute 11. The body 40 may define a recess 41 which corresponds to and matches the tongue 31. The tongue 31 is engaged in the recess 41 when the slide switch 20 is in the first position, and the tongue 31 is separated from the recess 41 when the slide switch 20 is in the second position, thereby implementing the engaging and removing of the battery cover 10 on the body 40. The battery cover catch apparatus of the present disclosure can be applied to consumer electronics, wireless communication devices and related technologies.

As shown in FIGS. 4 to 7, in some embodiments, the slide switch 20 may further include a connection portion 22 disposed in the chute 11 by passing through the chute 11 and connected to the block 21, and a handle 23 located on an outside of the battery cover 10 and connected to the connection portion 22. The handle 23 may be slidably engaged with an outer surface of the battery cover 10. The slide switch 20 can slide back and forth in the chute 11 when being forced on the handle 23. The handle 23 may be engaged with the battery cover 10 so that the sliding of the slide switch 20 is more stable. In other embodiments, the handle 23 may also be omitted, and the slide switch 20 can slide back and forth in the chute 11 by directly being forced on the connection portion 22.

The block 21 may include an elongated structure (not labeled) extending along a direction which is the same as the extending direction of the chute 11. The elongated structure has an outline not larger than an outline of the chute 11. The connection portion 22 and the middle portion of the block 21 are connected to form a T-shaped structure. During the installation of the slide switch 20, the block 21 can be passed through the chute 11 so as to install the slide switch 20 in place, hence the installation is more convenient.

A side of the catch 30 may be provided with an installation slot 32 for the block 21 to be inserted laterally, and another side of the catch 30 which is opposite to the slide switch 20 may be provided with an evading slot 33 for evading the connection portion 22 and communicating with the installation slot 32. The installation slot 32 and the evading slot 33 may form a T-shaped slot, and the T-shaped structure formed by connecting the block 21 and the connection portion 22 matches with the T-shaped slot, so that the application of the force of the slide switch 20 on the catch 30 is more balanced and smooth in the direction of the chute 11, which also ensures the structural strength. In other embodiments, the shape of the block 21 may not be limited, so long as the block 21 can be fixedly connected with the catch 30. The connection manner may include a snap connection, etc.

An inlet of the installation slot 32 may be provided with an oblique guide surface 34 for guiding the block 21 into the installation slot 32. The guide surface 34 protrudes from an inner surface of the installation slot 32 to form a limit stage 35 for preventing the block 21 from coming off. The limit stage 35 contacts and matches with a side of the block 21, thereby ensuring the stability of the structure after installation. In other embodiments, the guide surface 34 may also include an oblique angle disposed at the inlet of the installation slot 32, and the block 21 is fixedly connected to the installation slot 32 by interference fit. A side of the block 21 which is away from the battery cover 10 may be provided with a slope 211 corresponding to the inclination direction of the guide surface 34, so as to facilitate the installation of the block 21 into the installation slot 32. Of course, in other embodiments, the side of the block 21 which is away from the battery cover 10 can also be a flat surface.

The tongue 31 may protrude from a surface of the catch 30 which is opposite to the installation slot 32, and may be disposed on the surface of the catch 30 in the extending direction of the chute 11. The length of the tongue 31 can be determined according to the length of the chute 11, so as to ensure the strength of the tongue 31 and to ensure that the mating surface of the tongue 31 and the recess 41 is sufficiently large, thereby making the battery cover 10 be locked more stably and less likely to fall off.

As shown in FIGS. 1 to 3, the extending direction of the recess 41 is the same as the extending direction of the chute 11, a side wall of the recess 41 opposite to the battery cover 10 defines an opening 42 corresponding to the tongue 31, such that the tongue 31 can be detached from the recess 41 while separated from the recess 41. In other embodiments, the tongue 31 may also be engaged with the other side of the catch 30 so long as the tongue 31 can be engaged in and separated from the recess 41. The length of the recess 41 can be shorter so long as the length of the tongue 31 can be ensured and the engagement interval of the tongue 31 and the recess 41 can be ensured, which makes the battery cover 10 less likely to fall off.

The tongue 31 may be provided on a side of the catch 30 which is away from the battery cover 10. The gap between the tongue 31 and the battery cover 10 can be kept sufficiently spaced so that the side wall of the recess 41 which is opposite to the battery cover 10 is sufficiently thick, which ensures the structural strength of the tongue 30.

It is to be understood that the above-mentioned technical features may be used in any combination without limitation.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. A battery cover catch apparatus, comprising:
   a battery cover, defining a chute extending along a longitudinal direction;
   a slide switch engaged in the chute so as to slide between a first position and a second position, wherein the slide switch comprises a block located inside the battery cover;
   a catch comprising a tongue disposed in a same direction as an extending direction of the chute, wherein the block is connected to the catch so as to drive the catch to slide synchronously; and
   a body defining a recess correspondingly matching the tongue, wherein the tongue is engaged in the recess when the slide switch is in the first position, and the tongue is separated from the recess when the slide switch is in the second position.

2. The apparatus of claim 1, wherein the block comprises an elongated structure disposed in a same direction as the extending direction of the chute, and has an outline not larger than an outline of the chute, and a side of the catch is provided with an installation slot for the block to be inserted laterally.

3. The apparatus of claim 2, wherein an inlet of the installation slot is provided with an oblique guide surface for guiding the block into the installation slot.

4. The apparatus of claim 3, wherein the guide surface protrudes from an inner surface of the installation slot to provide a limit stage to prevent the block from coming off.

5. The apparatus of claim 3, wherein a side of the block away from the battery cover is provided with a slope corresponding to an inclination direction of the guide surface.

6. The apparatus of claim 3, wherein the tongue protrudes from a surface of the catch opposite to the installation slot, and is disposed on the surface of the catch in the extending direction of the chute.

7. The apparatus of claim 6, wherein an extending direction of the recess is the same as the extending direction of the chute, a side wall of the recess opposite to the battery cover defines an opening corresponding to the tongue so that the tongue may be detached from the recess while separated from the recess.

8. The apparatus of claim 6, wherein the tongue is engaged with a side of the catch away from the battery cover.

9. The apparatus of claim 8, wherein the slide switch comprises a connection potion disposed in the chute by passing through the chute and connected to the block, the connection portion and a middle portion of the block are connected to provide a T-shaped structure, and a side of the catch opposite to the slide switch defines an evading slot for evading the connection portion and communicating with the installation slot.

10. The apparatus of claim 9, wherein the slide switch further comprises a handle located on an outside of the battery cover and connected to the connection portion, and the handle is slidably engaged with an outer surface of the battery cover.

11. A battery cover catch apparatus, comprising:
a battery cover defining a chute;
a switch engaged in the chute and configured to slide from a first position to a second position, the switch comprising a block;
a catch engaged with the block and comprising a tongue; and
a body defining a recess having a same extending direction as the tongue, wherein the tongue is engaged in the recess, the tongue is inserted into the recess when the switch is in the first position, and the tongue is detached from the recess when the switch is in the second position.

12. The apparatus of claim 11, wherein the catch comprises an installation slot on one lateral side of the catch, an inlet of the installation slot is provided with an oblique guide surface which guides the block into the installation slot.

13. The apparatus of claim 11, wherein a side of the block away from the battery cover is provided with a slope having an inclination angle which guides the block into its engaging position with the catch.

14. The apparatus of claim 13, wherein the slide switch further comprises:
a connection portion connected to the block forming a T-shaped structure, wherein the block is an elongated structure having a same extending direction as the chute.

15. The apparatus of claim 14, wherein the slide switch further comprises:
a handle located outside the battery cover and connected to the connection portion, and the handle is slidably engaged with the battery cover.

16. A battery cover catch apparatus, comprising:
a battery cover defining a chute;
a switch engaged in the chute and configured to slide from a first position to a second position, the switch comprising a block;
a catch engaged with the block and comprising a tongue, wherein the tongue extends in a same direction as an extending direction of the chute; wherein the catch defines an installation slot on a lateral side of the catch, an inlet of the installation slot is provided with an oblique guide surface which guides the block into the installation slot.

17. The apparatus of claim 16, wherein a side of the block away from the battery cover is provided with a slope having an inclination angle which guides the block into its engaging position with the catch.

18. The apparatus of claim 17, wherein the slide switch further comprises:
a connection portion connected to the block forming a T-shaped structure, wherein the block is an elongated structure having a same extending direction as the chute.

19. The apparatus of claim 18, wherein the slide switch further comprises:
a handle located outside the battery cover and connected to the connection portion, and the handle is slidably engaged with the battery cover.

* * * * *